United States Patent
Khandelwal et al.

(10) Patent No.: US 10,877,995 B2
(45) Date of Patent: *Dec. 29, 2020

(54) BUILDING A DISTRIBUTED DWARF CUBE USING MAPREDUCE TECHNIQUE

(71) Applicant: Intellicus Technologies Pvt. Ltd., Madhya Pradesh (IN)

(72) Inventors: Ankit Khandelwal, Madhya Pradesh (IN); Kapil Ghodawat, Madhya Pradesh (IN); Sajal Rastogi, Madhya Pradesh (IN); Saurabh Gupta, Madhya Pradesh (IN)

(73) Assignee: INTELLICUS TECHNOLOGIES PVT. LTD.

( * ) Notice: Subject to any disclaimer, the term of this patent is extended or adjusted under 35 U.S.C. 154(b) by 814 days.

This patent is subject to a terminal disclaimer.

(21) Appl. No.: 14/459,735

(22) Filed: Aug. 14, 2014

(65) Prior Publication Data
US 2016/0048572 A1 Feb. 18, 2016

(51) Int. Cl.
*G06F 16/28* (2019.01)

(52) U.S. Cl.
CPC .................. *G06F 16/283* (2019.01)

(58) Field of Classification Search
CPC .................................. G06F 17/30592
See application file for complete search history.

(56) References Cited

U.S. PATENT DOCUMENTS

| 8,380,748 | B2 | 2/2013 | Berger et al. |
| 2003/0126143 | A1* | 7/2003 | Roussopoulos ... G06F 17/30592 |
| 2010/0121847 | A1* | 5/2010 | Olston ................ G06F 16/3325 |
| | | | 707/736 |

(Continued)

FOREIGN PATENT DOCUMENTS

| CN | 101183368 | 5/2008 |
| CN | 102508913 | 6/2012 |

(Continued)

OTHER PUBLICATIONS

Juan Zhang, "Building Quotient Cube with MapReduce in Hadoop", Proceedings of the 2nd International Symposium on Computer, Communication, Control and Automation (ISCCCA-13), Sep. 2013Wang Zhengkui.

(Continued)

*Primary Examiner* — Angelica Ruiz
(74) *Attorney, Agent, or Firm* — Hayes Soloway P.C.

(57) ABSTRACT

Systems and methods for building a distributed dwarf cube comprising dwarf cuboid using mapreduce technique are disclosed. Data comprising cube values and a cube definition may be received. The cube definition comprises dimensions defined for the cube values. The data received is processed. The data may be transformed to a format. Based upon the format of the data, indexes may be generated. The cube values in one or more dimensions may be sorted based on a cardinality of the cube values. The cube values may be sorted in an order of highest cardinality to lowest cardinality. The cardinality indicates distinctiveness of the cube values in the one or more dimensions. The data may be partitioned into data blocks. A dwarf cuboid may be built for one or more data blocks based upon the order of the cardinality of the cube values.

18 Claims, 8 Drawing Sheets

(56) References Cited

U.S. PATENT DOCUMENTS

| | | | |
|---|---|---|---|
| 2012/0182891 A1* | 7/2012 | Lee | H04L 43/04 370/252 |
| 2013/0013552 A1* | 1/2013 | Eshleman | G06Q 10/00 707/600 |
| 2014/0059552 A1* | 2/2014 | Cunningham | G09G 5/00 718/102 |
| 2014/0279838 A1* | 9/2014 | Tsirogiannis | G06F 17/30917 707/603 |
| 2014/0337274 A1* | 11/2014 | Unnikrishnan | G06N 5/047 706/48 |
| 2015/0106325 A1* | 4/2015 | Cole | G06F 16/283 707/604 |

FOREIGN PATENT DOCUMENTS

| | | |
|---|---|---|
| CN | 102982103 | 3/2013 |
| WO | WO2013175308 A1 | 11/2013 |

OTHER PUBLICATIONS

Wang Zhengkui, "Scalable Data Analysis on Mapreduce-Based Systems" 2013.

P Jan, "Modelisation Et Ex 'Ecution Des Applications 'D'analyse De Donnees Mulitidimentionnelles Sur ' Architectures Distribuees" Dec. 13, 2010.

Shi Jingang, Bao Yubin, Leng Fangling, and Yu Ge, "Efficient Parallel Dwarf Data Cube Using MapReduce"College of Information Science and Engineering, Northeastern University, Shenyang 110819, China, 2011.

Zhengkui Wang, Yan Chu, Kian-Lee Tan, Divyakant Agrawal, Amr El Abbadi, Xiaolong Xu, "Scalable Data Cube Analysis over Big Data", Nov. 22, 2013.

Yannis Sismanis and Nick Roussopoulos, "The Dwarf Data Cube Eliminates the High Dimensionality Curse" 2003.

Bo Wang, Hao Gui, Mark Roantree and Martin F. O'Connor, "Data Cube Computational Model with Hadoop MapReduce" Apr. 3, 2014.

* cited by examiner

Clustered Views

BUILDING A DISTRIBUTED DWARF CUBE USING MAPREDUCE TECHNIQUE

FIELD OF INVENTION

The present disclosure relates to a field of building a distributed dwarf cube. More particularly, the present disclosure relates to a system and method for building a distributed dwarf cube comprising a plurality of dwarf cuboids using a mapreduce technique.

BACKGROUND

With advent in technology, organizations are increasingly capturing and storing data generated by machines and humans, thereby resulting in generation of extremely large amount of data. The data generated comprises server logs or records of user interaction with websites, sales transaction data, etc. In order to effectively organize the data, the organizations utilize On-Line Analytical Processing (OLAP) systems. Generally, OLAP systems facilitate and manage analytical applications built by aggregating transactional data. OLAP systems may be built on a variety of transactions such a database management system transactions, business, or commercial transactions.

The OLAP systems enable users to analyze multidimensional data. Generally, analysis on the multidimensional data may include one or more operations such as, aggregate the data, slice and dice and drill-down. The slice and dice operation comprises taking specific sets of data and viewing the data from multiple viewpoints. Basis for the OLAP system is an OLAP cube. The OLAP cube is a data structure allowing for fast analysis of the data with capability of analyzing the data from multiple perspectives. Typically, the OLAP cubes are composed of numeric facts, called measures, and are categorized by dimensions. The measures are derived from fact tables, wherein the fact tables are typically composed of the measurements or data of a business process, e.g. number of products sold in a retail store. The dimensions are derived from dimension tables. In other words, a measure has a set of labels, where the description of the labels is provided in corresponding dimension.

The OLAP systems typically categorized as either a Relational Online Analytical Processing (ROLAP) or as a Multidimensional Online Analytical Processing (MOLAP). In ROLAP, the data is stored in relational databases. As known, a response time for processing a query in ROLAP may be unpredictable. Generally, SQL statements are generated to query the relational databases used as ROLAP Data warehouse. The response time can be long if size of the data is large.

On the other hand, in MOLAP, the data is stored in multidimensional cubes. In MOLAP, the data is pre-computed and the data is stored in an OLAP cube. The MOLAP system may store the data as an in-memory multidimensional data structure, rather than in a relational database. The pre-processing and storage of the data allows for fast query performance due to optimized storage, multidimensional indexing and caching of the data. As the data is stored in OLAP cubes, the data may be retrieved with a predictable response time and much faster than in ROLAP.

SUMMARY

This summary is provided to introduce concepts related to systems and methods for building a dwarf cuboid using a mapreduce technique and the concepts are further described below in the detailed description. This summary is not intended to identify essential features of the claimed subject matter nor is it intended for use in determining or limiting the scope of the claimed subject matter.

In one implementation, a method for building a distributed dwarf cube comprising a plurality of dwarf cuboids using a mapreduce technique is disclosed. The method comprises receiving data comprising cube values and a cube definition. The cube definition comprises dimensions defined for the cube values. The method further comprises processing the data. The processing further comprises transforming the data to a format. The processing further comprises generating indexes based upon the format of the data. The processing further comprises sorting the cube values on one or more dimensions based on a cardinality of the cube values. The cube values are sorted with in an order of highest cardinality to lowest cardinality. The cardinality indicates distinctiveness of the cube values in one or more dimensions. The method further comprises partitioning of the data into data blocks. The method further comprises building a dwarf cuboid for one or more data blocks based upon the order of the cardinality of the cube values.

In one implementation, a system for building a distributed dwarf cube comprising a plurality of dwarf cuboids using a mapreduce technique is disclosed. The system comprises a processor and a memory coupled to the processor. The processor executes a program instructions stored in the memory. The processor executes the program instructions to receive data comprising cube values and a cube definition. The cube definition comprises dimensions defined for the cube values. The processor further executes the program instructions to process the data. The processing comprises transforming the data to a format. The processing further comprises generating indexes based upon the format of the data. The processing further comprises sorting the cube values in one or more dimensions based on a cardinality of the cube values. The cube values are sorted with in an order of highest cardinality to lowest cardinality. The cardinality indicates distinctiveness of the cube values in the one or more dimensions. The processor further executes the program instructions to partition the data into data blocks. The processor further executes the program instructions to build a dwarf cuboid for one or more data blocks based upon the order of the cardinality of the cube values.

In one implementation, a non-transitory computer readable medium embodying a program executable in a computing device for building a distributed dwarf cube comprising a plurality of dwarf cuboids using a mapreduce technique is disclosed. The program comprises a program code for receiving data comprising cube values and a cube definition. The cube definition comprises dimensions defined for the cube values. The program further comprises a program code for processing the data. The processing comprises a program code for transforming the data to a format. The processing further comprises a program code for generating indexes based upon the format of the data. The processing further comprises a program code for sorting the cube values in one or more dimensions based on a cardinality of the cube values. The cube values are sorted with in an order of highest cardinality to lowest cardinality. The cardinality indicates distinctiveness of the cube values in the one or more dimensions. The program further comprises a program code for partitioning the data into data blocks. The program further comprises a program code for building a dwarf cuboid for one or more data blocks based upon the order of the cardinality of the cube values.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to refer like/similar features and components.

DETAILED DESCRIPTION

Figure 1:
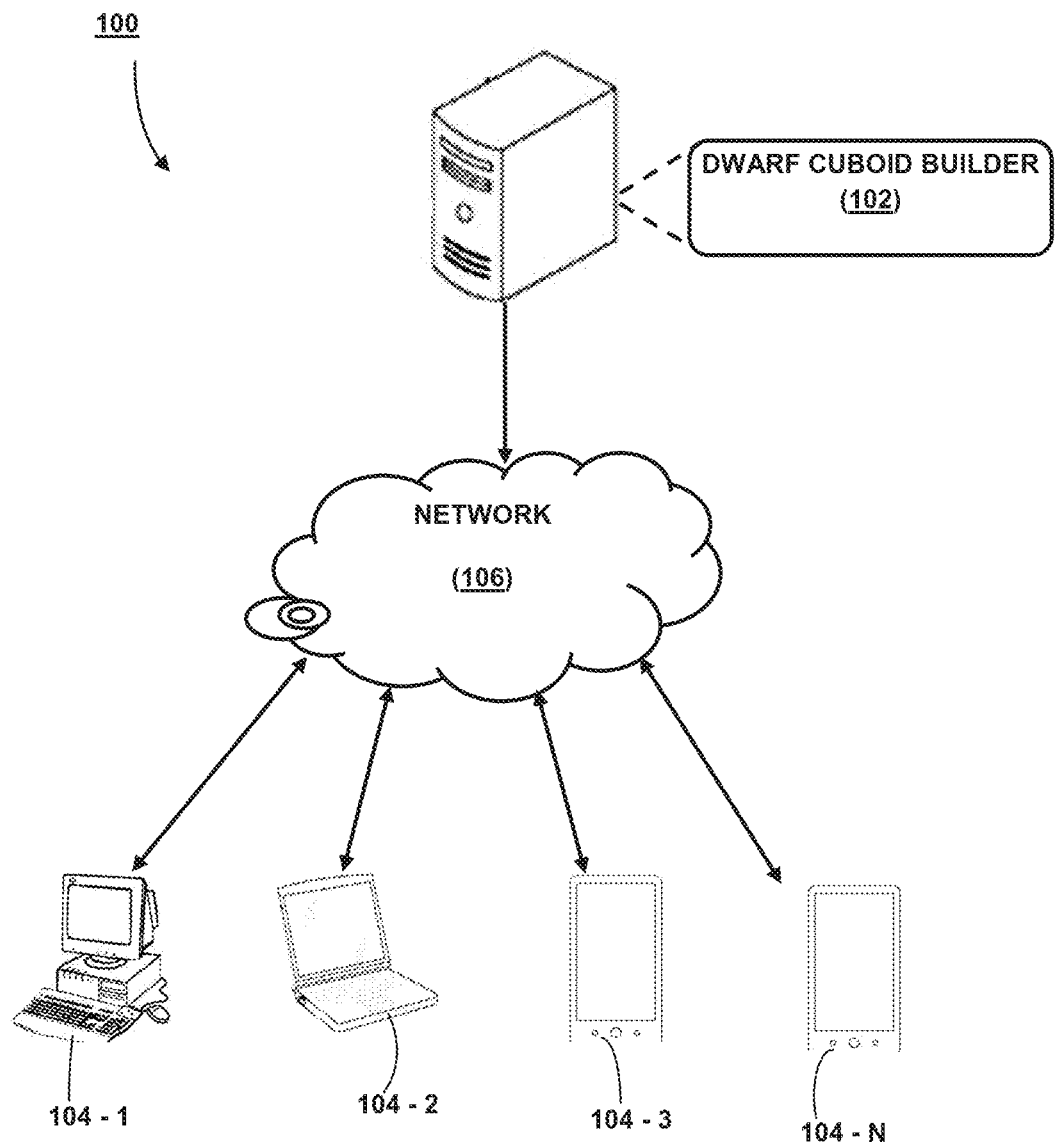
FIG. 1 illustrates a network implementation of a dwarf cuboid builder for building a distributed dwarf cube using a mapreduce technique, in accordance with an embodiment of the present disclosure.

Systems and methods for building a distributed dwarf cube using a mapreduce technique are disclosed. In order to improve speed of calculation on massive data, an improved method for building multiple dwarf cuboids for Multidimensional Online Analytical Processing (MOLAP) is disclosed. In the present disclosure, the dwarf cuboids are built and are distributed on multiple computers using mapreduce. The dwarf cuboids are structured such that they can be incrementally updated.

In order to build the distributed dwarf cube comprising a plurality of dwarf cuboids, at first, the dwarf cuboid builder triggers a distributed dwarf cube building activity. In the distributed dwarf cube building activity, at first, data comprising cube values and a cube definition may be received. The cube definition comprises dimensions defined for the cube values. For building the dwarf cuboid, a series of mapreduce jobs may be launched. The data received may be given as an input for a first mapreduce job. Further, after the first mapreduce job, an output of the first mapreduce job may be given as an input to a second mapreduce job. Similarly, for subsequent mapreduce jobs, an output generated by a previous mapreduce job may be provided as an input for a next mapreduce job. In the series of mapreduce jobs, first two mapreduce jobs process the data. The data may be processed by transforming the data to a format. The processing further comprises indexing for dimension members, finding dimension cardinalities and deciding dimension order, total order partitioning of the data, replacing member names with indexes etc.

While processing the data, the indexes are generated based upon the format of the data. Based on the indexes generated, the cube values in one or more dimensions may be sorted based on a cardinality of the cube values. The cube values are sorted in an order of highest cardinality to lowest cardinality. The cardinality indicates distinctiveness of the cube values in the one or more dimensions. Subsequently, the data is partitioned into data blocks. A dimension with highest cardinality is selected for partitioning the data. After partitioning the data, the mapreduce jobs are processed to build the dwarf cuboid. A dwarf cuboid is built with the dimension with highest cardinality as the root dimension of dwarf. Further, the dimension with highest cardinality may be eliminated. Upon emitting the data after eliminating the highest cardinality, the data may be sorted. For the data remaining, the dimension comprising second highest cardinality is selected as the root for the remaining data and sorting remaining data. Similarly, the dwarf cuboid are built for the remaining data eliminating next highest cardinality dimension and sorting further remaining data based upon the order of the cardinality of the cube values.

While aspects of described dwarf cuboid builder and method for building a dwarf cuboid using a mapreduce technique may be implemented in any number of different computing systems, environments, and/or configurations, the embodiments are described in the context of the following exemplary dwarf cuboid builder.

Referring now to FIG. 1, a network implementation 100 of a dwarf cuboid builder 102 for building a dwarf cuboid using a mapreduce technique is illustrated, in accordance with an embodiment of the present disclosure. The dwarf cuboid builder 102 may receive data comprising cube values and a cube definition. The cube definition may comprise dimensions defined for the cube values. The dwarf cuboid builder 102 may process the data to transform the data to a format and to generate indexes based upon the format of the data. The dwarf cuboid builder 102 may sort the cube values in one or more dimensions based on a cardinality of the cube values. The cube values are sorted in an order of highest cardinality to lowest cardinality. The dwarf cuboid builder 102 may partition the data into data blocks. For the one or more data blocks, the dwarf cuboid builder 102 may build a dwarf cuboid based upon the order of the cardinality of the cube values.

Although the present disclosure is explained by considering a scenario that the dwarf cuboid builder 102 is implemented as an application on a server. It may be understood that the dwarf cuboid builder 102 may also be implemented in a variety of computing systems, such as a laptop computer, a desktop computer, a notebook, a workstation, a mainframe computer, a server, a network server, and the like. It will be understood that the dwarf cuboid builder 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the dwarf cuboid builder 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
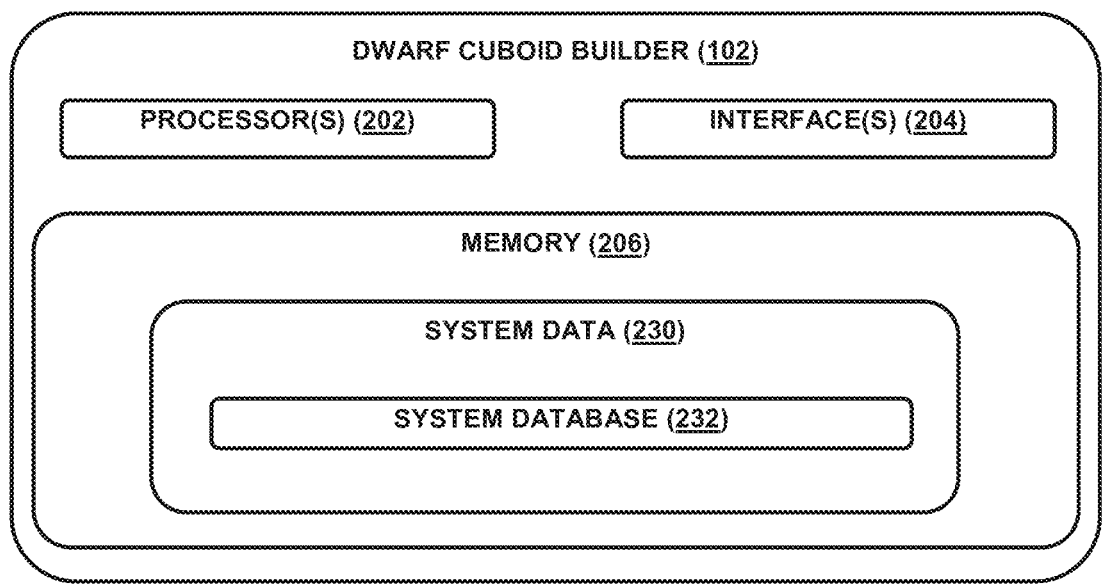
FIG. 2 illustrates the dwarf cuboid builder of FIG. 1, in accordance with an embodiment of the present disclosure.

Referring now to FIG. 2, the dwarf cuboid builder 102 is illustrated in accordance with an embodiment of the present disclosure. In one embodiment, the dwarf cuboid builder 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the dwarf cuboid builder 102 to interact with a user directly or through the user devices 104. Further, the I/O interface 204 may enable the dwarf cuboid builder 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include system data 230.

The system data 230, amongst other things, serves as a repository for storing data processed, received, and generated during execution of program instructions stored in the memory 206 by the at least one processor 202. The system data 230 may also include a system database 232.

In one implementation, at first, a user may use the client device 104 to access the dwarf cuboid builder 102 via the I/O interface 204. The working of the dwarf cuboid builder 102 may be explained in detail using FIG. 2, FIG. 3, FIG. 4 and FIG. 5 explained below. The dwarf cuboid builder 102 may be used for building a dwarf cuboid using a mapreduce technique. The dwarf cuboid builder 102 may comprise a plurality of nodes or machines. Example of nodes may include a computer, a server, or any other computing device. The dwarf cuboid builder 102 may be responsible for triggering cuboid building activity. The user may interact with the dwarf cuboid builder 102 using a client application on the client device 104 in order to define and build/create the dwarf cuboid.

Figure 3:
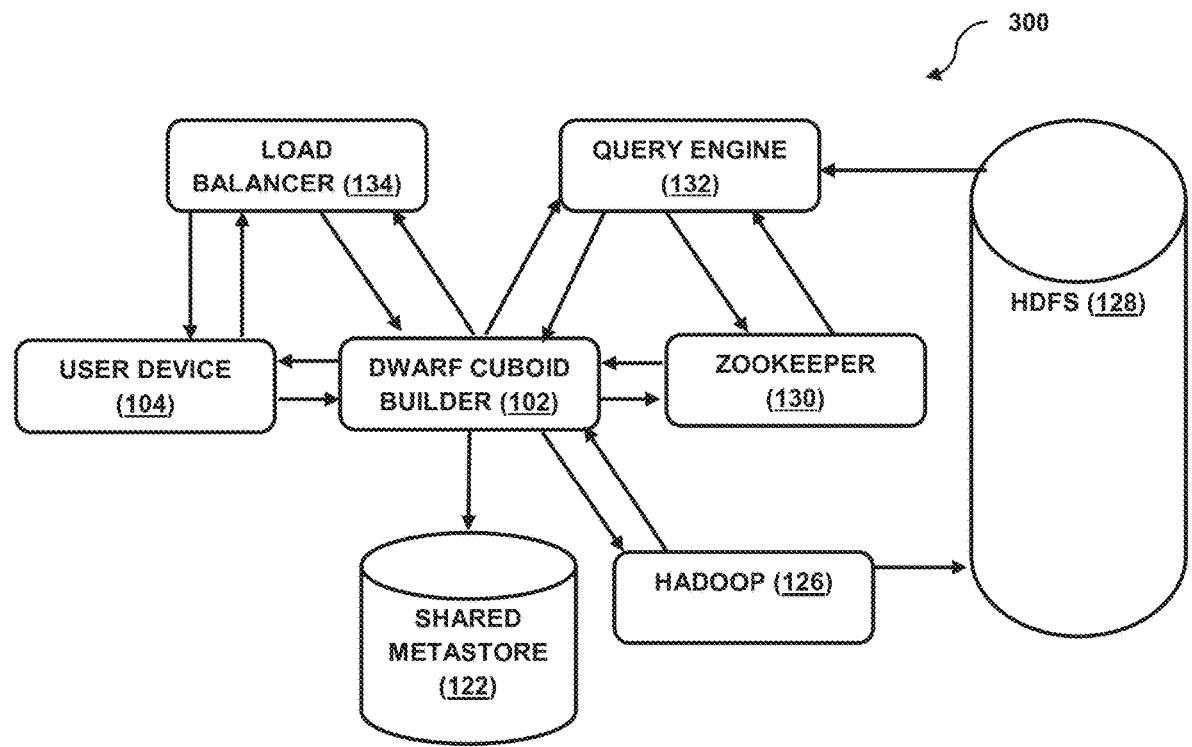
FIG. 3 illustrates the system comprising various components, in accordance with an embodiment of the present disclosure.

Referring now to FIG. 3, a system 300 used for building and storing the dwarf cuboid using the dwarf cuboid builder 102 is shown. As shown in the system 300, the dwarf cuboid builder 102 may interact with a shared metastore 122, a Hadoop cluster 126, a Hadoop Distributed Files System (HDFS) 128, a zookeeper 130, a plurality of query engines 132, a plurality of load balancers 134. The Hadoop cluster 126 may comprise a cluster of computers or nodes that works seamlessly in a distributed computing platform. Hadoop is a software library that allows for distributed processing of the data across the cluster of nodes. Hadoop is designed to scale from one to thousands of nodes, where each node is a computer responsible for its own processing and storage of the data. The functioning of components present in the system 300 is explained in detail in the following description.

At first, the dwarf cuboid builder 102 may receive data comprising cube values and a cube definition. The cube definition may comprise dimensions defined for the cube values. The dimension may indicate a structural attribute of the dwarf cuboid that is a list of related names such as members, such that the dimensions belong to a similar category in the user's perception of the data. For example, months and quarters may indicate a time dimension. Similarly, cities, regions and countries may indicate a location dimension. The dimension may comprise a star schema with a set of files or a flat schema with a single file. The star schema comprises one or more fact tables referencing number of dimension tables. A fact table may be a central table in the star schema of the data. The fact table may store quantitative information for analysis. The dimension table may store the information on types of analysis in which the data in the fact table may be analysed. The cube values may indicate values corresponding to the dimensions in the data. In one embodiment, the user may specify/define the dimensions, measures, appropriate data sets for the data. The measures may be derived from the fact tables. The measures may be composed of measurements or information of a business process. Further, dimensions may be derived from the dimension tables. In other words, a measure comprises a set of labels, where the description of the labels is described in the corresponding dimension. The cube definition may be captured in a form of an Extensible Markup Language (XML) file. The cube definition may also comprise metadata corresponding to the dimensions, the measures, and locations of the data sets on the HDFS 128. In one implementation, the cube definition may be stored in the repository/shared metastore 122.

Post storing the data in the repository, a series of mapreduce jobs may be launched on the data. Each mapreduce job may comprise a mapper and a reducer to execute the program instructions. The mapper may take a task, divide the task into sub-tasks and may distribute the task to the plurality of nodes in the dwarf cuboid builder 102. Each of the plurality of nodes may further divide the sub-tasks. Upon processing the task assigned to the plurality of nodes, the reducer may collect response to the tasks and provides an output. At first, the data may be given as an input to a first mapreduce job. Further, after the first mapreduce job, an output of the first mapreduce job may be given as an input to a second mapreduce job. Similarly, for subsequent mapreduce jobs, an output generated by the previous mapreduce job may be provided as the input for the subsequent mapreduce job. Specifically, during the first mapreduce job, the data may be transformed to a format. Steps involved in transforming the data to a format are explained in detail below.

In one embodiment, the series of mapreduce jobs described above may be launched by a driver. The driver comprises the program instructions to invoke the mapreduce jobs. The driver may initialize the job and may be instructed by the dwarf cuboid builder 102 to execute the program instructions on a set of input files and to control where the output files are placed. The driver may identify the dataset based on the dimension being fact table or not i.e. single file or star schema. The driver may launch the mapreduce jobs for indexing the data. The driver may launch different levels of mapreduce jobs for processing the data comprising the cube values. In order words, the driver may determine an input location for the mapper with respect to the fact table of the data from which the data has to be read. The driver may comprise a logic for deciding number of mapreduce jobs required to execute, what/which data to be processed using a particular job, the datasets required to be indexed, location of the datasets from which the job has to be read. The driver may read the metadata in the form of the XML file and may designate the job to the mapreduce job. The driver may provide jobs (information) to the mapper to execute the program instructions.

Figure 4:
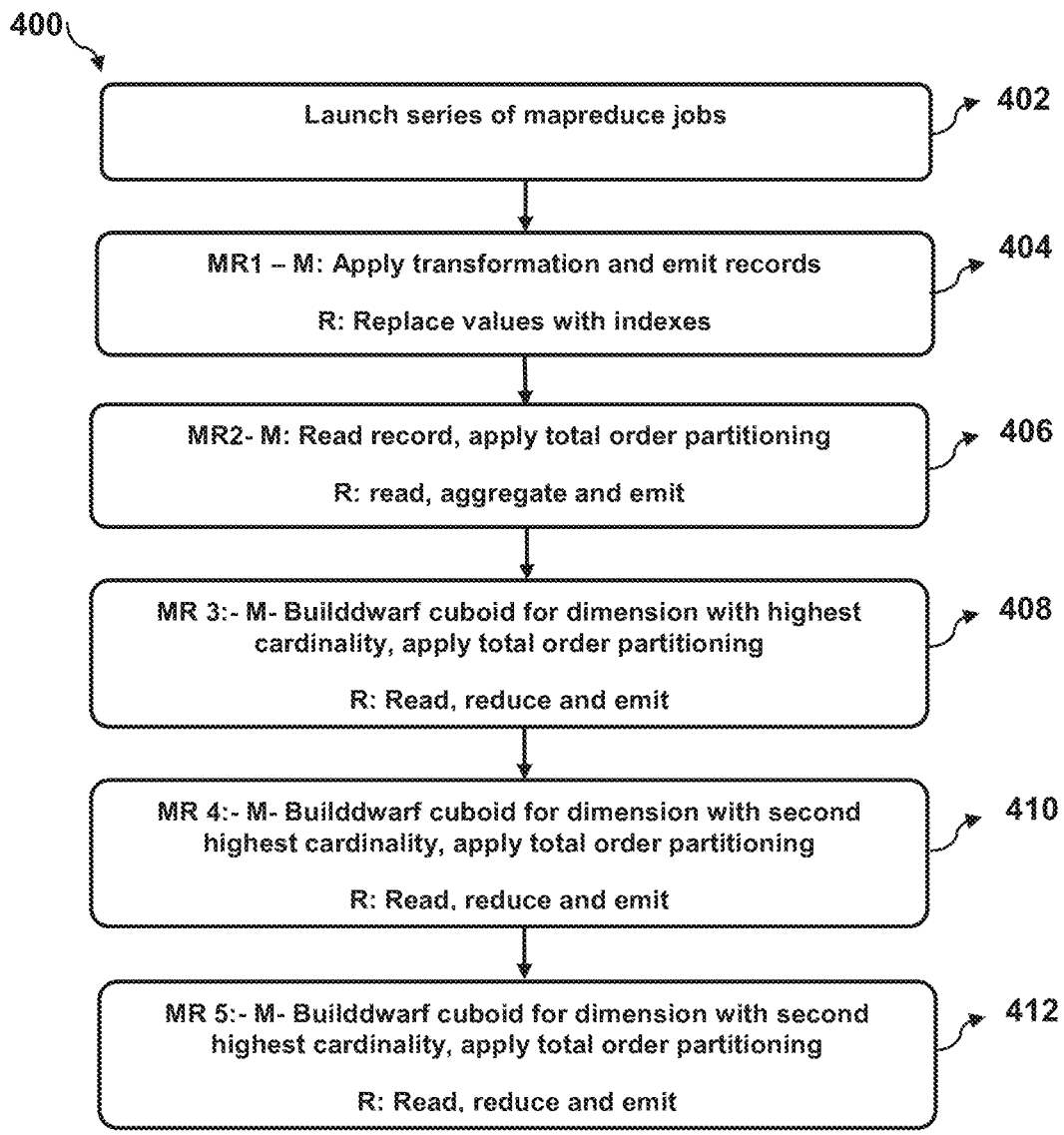
FIG. 4 illustrates a method for implementing a series of mapreduce jobs, in accordance with an embodiment of the present disclosure.

In order to understand execution of the series of mapreduce jobs by the dwarf cuboid builder 102, a flowchart shown in FIG. 4 may be used. At first, a first mapreduce job of the series of mapreduce jobs may be launched at step 402. In the first mapreduce job, a dimension of the data may be checked for a fact table or a single file/star schema. If the dimension of the data comprises the single file the data for a given dimension may be processed first and then the data may be indexed. Specifically, at the first mapreduce job, the mapper may read the data from the specified location as may be defined in the cube definition. At step 404, based on the cube definition, the mapper may transform the data depending on operations to be performed on the data. In one example, the datasets may be transformed by adding custom fields to the data. The mapper may rationalize the data as may be defined during the transformation. The mapper may apply the transformations on the data and may emit the data to the reducer. After the mapper emitting the data at the first mapreduce job, for the star schema, the reducer at the first mapreduce job may replace the cube values with indexes. Further, for the dimensions in the single file that are not indexed at the time of processing, the reducer at the first mapreduce job may create/insert indexes. The indexing mapreduce job may be used for pre-building indexes for the star schema. In other words, using location of the data present in the XML file (cube definition), the data may be processed and indexes are generated for primary keys in sorted order for the cube values in the dimension. Specifically, the reducer at the first mapreduce job may create a tree-map for the cube values. The tree-map may be a disk based tree-map or B tree like data structure. The reducer at the first mapreduce job may create a set of tree-maps, one tree-map for each of the dimension that needs to be indexed. When the reducer receives the cube values, the reducer may insert the cube values into the tree-maps. Further, the cube values that are distinct may be collected from the tree-maps. The cube values that are distinct may be sorted for a given dimension. After completion of the first mapreduce job, the cube values that are distinct from each reducer may be collected at the driver and may be merged to create a single sorted map. The single sorted map may be used for generating indexes. The cube values may be replaced with the indexes for the dimensions.

However, if a dimension is of a fact table, the first mapreduce job may process the fact table and the data corresponding to the dimensions simultaneously and may create indexes for all the dimensions simultaneously.

In any case, whether the dimension is of a fact table or of a star schema, after inserting the indexes, the reducer at the first mapreduce job may emit the data with the cube values for each dimension and measures. The data processed by the reducer at the first mapreduce job may be stored on the HDFS 128. Further, at the end of first mapreduce job, the cube values corresponding to the dimension member might have been replaced with the indexes i.e., star schema. From the reducer of the first mapreduce job, a level of cardinality may be determined for the one or more dimensions. The cardinality indicates the number of distinctiveness of the cube values present in one or more dimensions. The dimensions may be arranged in the order of distinctiveness of the cube values. In other words, the dimensions may be arranged in the order of highest cardinality to lowest cardinality.

Upon processing of the data at the first mapreduce job, an output of the reducer at the first mapreduce job may be provided as an input to a mapper at a second mapreduce job. At the mapper of the second mapreduce job, the data may be arranged based on the cardinality of the cube values. The mapper of the second mapreduce job may emit the data. At step 406, the data that is emitted by the mapper of the second mapreduce job may be sorted. The cube values may be sorted in a decreasing order of cardinality, i.e., in an order of highest cardinality to lowest cardinality. In one implementation, the reducer at the second mapreduce job may sort the data based on the cardinality. The output of the second mapreduce job may be stored on the HDFS 128.

After sorting the data based on the cardinality at the second mapreduce job, a mapper at a third mapreduce job may be utilized to build the dwarf cuboid. The output of the second mapreduce job may be split or partitioned into data blocks. Each data block may correspond to a/single dwarf cuboid. At step 408, each data block may be processed by the mapper at the third mapreduce job. Before initiating third mapreduce job, the order of the dimension may be known. The mapper at the third mapreduce job may create/build the dwarf cuboid using a dwarf algorithm. The dwarf algorithm may be used as presented in the U.S. Pat. No. 7,133,876, Titled Dwarf cube architecture for reducing storage sizes of multidimensional data and assigned to The University of Maryland College Park. After the mapper at the third mapreduce job maps the data, the dwarf cuboid created may be stored on the HDFS 128. Upon storing the data on the HDFS 128, the dwarf cuboid builder 102 may maintain distribution of the dwarf cuboid.

After building the dwarf cuboid at the third mapreduce job, the dimensions with the highest cardinality may be eliminated. At the third mapreduce job, a mapper may emit remaining data after eliminating the dimensions with the highest cardinality. After emitting, the remaining data may be sorted for the dimension with second highest cardinality. In one implementation, a reducer at the third mapreduce job may sort the remaining data with the second highest cardinality. The remaining data sorted may be stored on the HDFS 128. Similarly, the dwarf cuboid may be built with second highest cardinality at the fourth mapreduce job. After building the dwarf cuboid for the dimension with the second highest cardinality by a mapper at the fourth mapreduce job, the data may be emitted with the second highest cardinality at step 410. After the data is emitted by the mapper, a reducer at the fourth mapreduce job may sort the further remaining data. Subsequently, the dwarf cuboid may be built for the dimensions with the third highest cardinality at a fifth mapreduce job. At step 412, the fifth mapreduce job comprising a mapper may build the dwarf cuboid and may emit the remaining data by eliminating the third highest cardinality. The data emitted by the mapper may be sorted by a reducer at the fifth mapreduce job. The data sorted may be stored on the HDFS 128. Similarly, the data may be processed for building dwarf cuboids for the dimensions until the data is reached to no dimension i.e. zero dimension cardinality. For each dwarf cuboid that is built, the dwarf cuboid builder 102 may maintain/manage the metadata of the dwarf cuboid.

Figure 5:
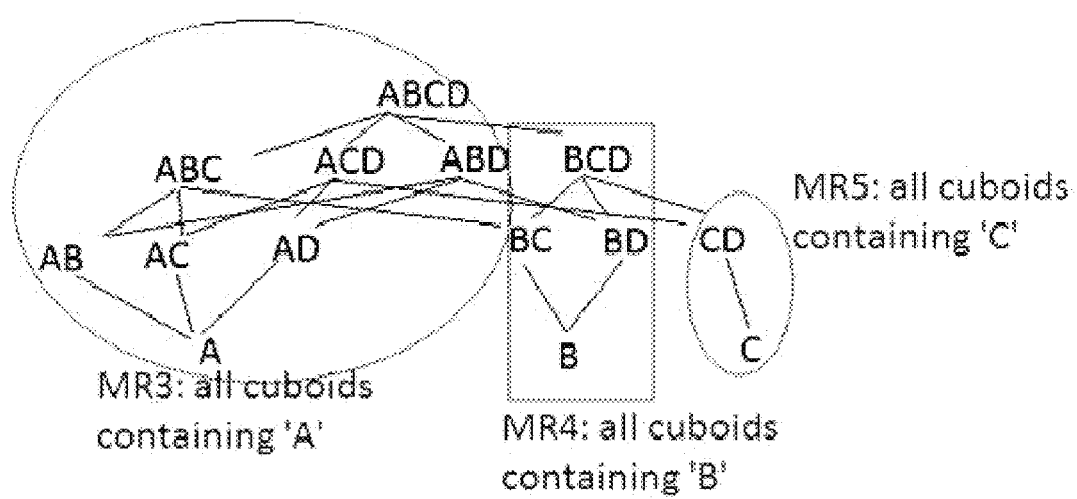
FIG. 5 illustrates building of the dwarf cuboid structure, in accordance with an embodiment of the present disclosure.

In order to better understand the building of the cuboid, FIG. 5 may be used as an example. Specifically, FIG. 5 shows the dimensions ABCD being arranged after the second mapreduce job. From the FIG. 5, it may be noted that the dimension A comprises highest cardinality followed by B, C, and D.

At the third mapreduce job (MR3), the mapper may create/build the dwarf cuboid for the dimension ABCD and may emit the data comprising the dimension BCD. The mapper may partition the dimension B. The reducer at the third mapreduce job may read, reduce by aggregating the cube values and may emit the cube values.

At the fourth mapreduce job (MR4), the mapper may create/build the dwarf cuboid for the dimension BCD and may emit the dimension CD. The mapper may partition the dimension C. The reducer at the fourth mapreduce job may reduce the data by aggregating and may emit the cube values.

At the fifth mapreduce job (MR5), the mapper may create/build the dwarf cuboid for the dimension CD and may emit the dimension D. The mapper may partition the dimension D. The reducer at the fifth mapreduce job may reduce the data by aggregating and may emit the cube values.

At the sixth mapreduce job (MR6), the mapper may create/build the dwarf cuboid for the dimension D and may not emit the cube values, as there is no data is remaining to build the dwarf cuboid. The reducer at the fifth mapreduce job may not run as there is no job is available.

As the dwarf cuboid is built using the mapreduce jobs instead of having a single large consolidated dwarf cuboid, the dwarf cuboid builder 102 may create multiple smaller dwarf cuboids. The dwarf cuboid builder 102 may build the dwarf cuboid at map stage using the mapreduce technique such that the number of the dwarf cuboids created is equal to number of splits or data blocks. The mapreduce technique allows creating/building multiple splits of the data based on size and all the splits are processed in parallel. As the splits are processed in parallel, one mapper may be launched per split or the data block. Building of the dwarf cuboids at the map stage allows even distribution of the data blocks among various dwarf cuboids and may provide horizontal scaling. If the splits are created randomly using a hash partitioning as may be presented in the prior art, the dwarf cuboid builder 102 may not have knowledge of what the each dwarf cuboid contains. Without the knowledge of the dwarf cuboid comprising the data may result in querying each and every dwarf cuboid. In order to have equal number of the dwarf cuboids for the splits or the data blocks, the data may be partitioned into the data blocks. By partitioning the data, a range comprising a start and an end values for each split may be determined. For the range determined, the user might be aware of each dwarf cuboid comprising the data. When the querying process would like to search for the dwarf cuboid, a binary search may be performed on the ranges determined and the dwarf cuboid may be located based on the query.

As presented above, the dwarf cuboid builder 102 may comprise the plurality of nodes or machines. One of the nodes in the plurality of nodes may act as a coordination master. The coordination master may comprise information related to which machine/node comprises the dwarf cuboid, location of the dwarf cuboid, the data that the dwarf cuboid may corresponds/represents, the cube values defined in ranges that the dwarf cuboid may be storing, etc. In a case when the coordination master does not function, one of the nodes remaining in the dwarf cuboid builder 102 may take over the responsibility of the coordination master. Further, the coordination master may ensure and maintain sanity of the metadata corresponding to the dwarf cuboid. The dwarf cuboid builder 102 may comprise the metadata such as the node comprising the data in the dwarf cuboid. The metadata may be used at time of querying the cube values. In one example, Table 1 may be used as an example to illustrate the dwarf cuboid builder 102 maintaining the metadata. Consider the dwarf cuboid comprising three dimensions, product, store and time. For example, product comprises BrandName (B)-ProductName (P) such as B1=P1-P50, B2=P51-P70, B3=P71-P80. The store may comprise StoreCountry, StoreState, StoreCity, and StoreName. The time may comprise Year, Quarter (Qtr) and Month. The dwarf cuboid builder 102 may maintain the metadata as shown in Table 1.

Table 1: Metadata Maintained by the Dwarf Cuboid Builder 102

TABLE 1

| DimName | startKey-endKey | cuboid UID |
| --- | --- | --- |
| Product | B1.P1-B1.P40 | cuboid#1 |
|  | B1.P41-B2.P60 | cuboid#2 |
|  | B2.P61-B3.P80 | cuboid#3 |
| Store | USA.CA.LosGatos.store1 | cuboid#4 |
| Time | 1997.Q1.Jan | cuboid#5 |

Each node in the dwarf cuboid builder 102 may send the metadata of the dwarf cuboid to the coordination master. In one example, the metadata of the dwarf cuboid may be sent to the coordination master via a Thrift remote procedure call (RPC). The thrift RPC may indicate a remote process that enables the dwarf cuboid builder 102 to call the program instructions. The program instructions may be called on a different node or another process on the same node of the dwarf cuboid builder 102. The thrift RPC may allow the dwarf cuboid builder 102 to define data types and service interfaces in a definition file. The thrift RPC may take the definition file as an input and generate program instructions to build RPC clients and servers that communicate seamlessly across programming languages. The Thrift RPC may allow transmitting of the data in a binary format among the plurality of nodes in the dwarf cuboid builder 102.

In one implementation, the coordination master may be responsible for distributing the dwarf cuboid on the plurality of query engines 132. The coordination master may distribute the dwarf cuboid by replicating the dwarf cuboid on the plurality of query engines 132. The coordination master may maintain the information corresponding to the replication in the shared metastore 122. The coordination master may execute the replication by passing the information related to the replication to a cuboid distribution thread manager. The cuboid distribution thread manager may comprise a plurality of threads. Each thread may comprise program instructions capable of or subject to synchronization with the plurality of the query engines 132. The plurality of threads may run in parallel, in sequence, or in combination. The coordination master may send a plurality of requests to replicate the dwarf cuboid. Based on the plurality of requests, the cuboid distribution thread manager may have a queue to hold the plurality of requests for replicating the dwarf cuboid on the plurality of query engines 132. In one implementation, when the plurality of requests is received, cuboid distribution thread manager may launch the plurality of threads to replicate the dwarf cuboids. In one example, the request for replicating the dwarf cuboids to different threads may run in parallel. When a request is received for replicating the dwarf cuboid on the query engine 132, the thread may copy the dwarf cuboid from the HDFS 128 and may replicate the dwarf cuboid on the query engine 132 locally accessible files or in-memory of the query engine 132 that is not part of the HDFS 128. In a case when a thread is free, the cuboid distribution thread manager may assign a new request for replication to the thread. Based on the new request, the thread may replicate the dwarf cuboid on the query engine 132. If the request is received for replicating two or more dwarf cuboids, the coordination master may assign the request for the replication to different threads.

In order to replicate the dwarf cuboids on the plurality of query engines 132, each thread may select N query engines 132 on which the dwarf cuboids may be replicated. N may indicate a replication factor. For example, consider there are M query engines 132, where N<M. In one example, N out of M query engines 132 may be selected for the replication on the basis of health/status/state of the query engines 132. The thread may receive the information related to the health/state of the plurality of query engines 132 from the zookeeper 130. If N>=M, the replication may be performed on the plurality of query engines 132, i.e. M. Each of the thread may send the information related to replication for selecting the query engine 132. The information for replicating the dwarf cuboid on the query engine 132 may be sent through the Thrift RPC. The query engine 132, upon receiving the request for the replication may copy the dwarf cuboid from the HDFS 128 to a local disk (not shown) in the query engine 132.

When the request for replicating the dwarf cuboid is received, the query engine 132 may send an acknowledgement of success or failure of the replication to the coordination master. After receiving the acknowledgement, the coordination master may update the shared metastore 122. The coordination master may update the shared metastore 122 that a given cuboid is stored in a particular query engine 132. In a case when the request for the replication fails, the coordination master may re-send the request for the replication. In one example, three attempts may be made for replication of the dwarf cuboid to the query engine 132. After three attempts, if the replication fails, the coordination master may update the shared metastore 12 of the failure. The replication may be failed because of several reasons including but not limited to failure of the query engine 132, non-availability of the query engine, etc. When the replication fails due to non-availability of the query engine 132, a new request may be made when a new query engine 132 arises using the description provided above.

After replicating the dwarf cuboids on the plurality of query engines, each query engine 132 may comprise a copy of the dwarf cuboid on the local disk. In one implementation, the user may designate the number of copies to be stored on the query engine 132. Based on the number of copies stored on the query engine 132, the coordination master may maintain the metadata of the query engine 132. The metadata may comprise the number of copies that are stored in the query engine 132. In one example, the coordination master may maintain the metadata in the shared metastore 122. In one implementation, the shared metastore 122 may be a Relational database management system (RDBMS) comprising a table determining the location of the query engine 132 and the dwarf cuboid stored in the local disk. At the time replicating the dwarf cuboids, if a query engine 132 breaks down, the coordination master may designate other query engine 132 to store/create the copy of the dwarf cuboid on the local disk.

The plurality of query engines 132 status/state may be maintained by the zookeeper 130. In one implementation, the query engines 132 may register themselves with the dwarf cuboid builder 102 and the registration may be maintained by the zookeeper 130. The zookeeper 130 may be used to update the runtime configuration changes of the plurality of nodes in the dwarf cuboid builder 102, the query engine 132 and the coordination master. Further, the zookeeper 130 may store information of the coordination master. In one embodiment, the zookeeper 130 may be used for electing a leader node in the dwarf cuboid builder 102. As presented earlier, if the coordination master breaks down, another node in the plurality of nodes may have to take the responsibility as the coordination master. When the coordination master breaks down, the zookeeper 130 may receive the information of the newly elected node that may act as the coordination master.

At any time during the dwarf cuboid building and replicating the dwarf cuboid on the plurality of query engines 132, the state/status of the plurality of nodes in the dwarf cuboid builder 102 may be maintained. Specifically, the state/status of the plurality of nodes in the dwarf cuboid builder 102 corresponding to the load the nodes experiencing may be maintained by the plurality of load balancers 134. The load that the dwarf cuboid builder 102 has may be distributed among the plurality of nodes in the dwarf cuboid builder 102. Similarly, the load that the dwarf cuboid builder 102 experience at the time of querying may be managed by the plurality of load balancers 134. The plurality of load balancers 134 may comprise nodes or machines that are part of the dwarf cuboid builder 102. In one embodiment, the plurality of load balancers 134 may comprise nodes that are not part of the dwarf cuboid builder 102. Based on the load at each of the node, the plurality of load balancers 134 may assign a particular task to the node. For example, consider the plurality of load balancers 1 . . . N responsible for distributing requests by the user across the dwarf cuboid builder 102. One of the nodes in the plurality of load balancers may act as a primary master that may be active and other nodes may act as secondary masters. The secondary masters may remain passive until the primary master perishes. When the node acting as the primary node perishes, one of the secondary masters may take the responsibility of the primary master.

Figure 6A:
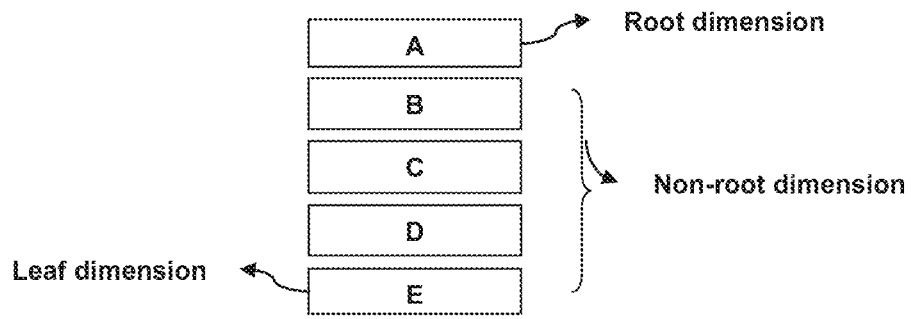
FIG. 6A illustrates root dimension and non-root dimensions arranged in an order, in accordance with an embodiment of the present disclosure.
Figure 6B:
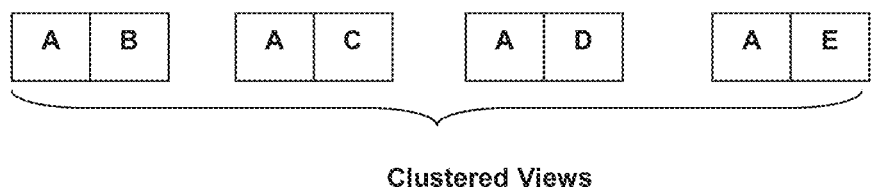
FIG. 6B illustrates views of the clustered root dimension and non-root dimensions, in accordance with an embodiment of the present disclosure
Figure 6C:
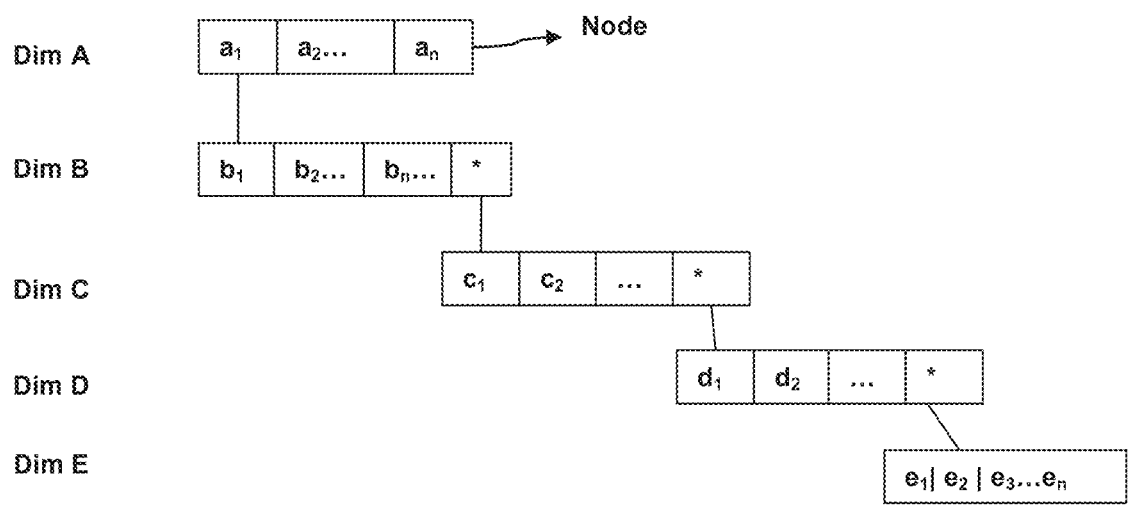
FIG. 6C illustrates nodes comprising values according to the views, in accordance with an embodiment of the present disclosure.

In one implementation, one or more dimensions comprised under a root dimension and one or more non-root dimension may be clustered when building the dwarf cuboid. The one or more dimensions may be clustered to reduce response time for a query requiring data from the one or more dimensions, but the querying path not originating from the root dimension. Consider the dwarf cuboid comprises dimensions A, B, C, D and E. Consider, the dimension A is the root dimension and B, C, D and E are the next level dimensions in that order as shown in FIG. 6A. The dimension present at bottom level may be termed as a leaf dimension. For the above example, views of the two or more dimensions may be clustered to form clustered views. For example, the views of the root dimension and at least one non-root dimension may be clustered as AB, AC, AD and AE as shown in FIG. 6B. When the views are clustered, the nodes corresponding to the views may be kept on contiguous space in the structure of the dwarf cuboid in memory system or on the file system. For example, when the views are clustered, for the view AE, the view may comprise (a1, a2, a3, a4, a5 . . . ) as values of A as shown in FIG. 6C. In the views, a1 may point to the node comprising B and * of B may point to a node of C. Further * of node C may point to a node D and * of D. Further * of D may point to the node of E. The node pointing from A to E may be presented as <a1,*,*,*, E> or <a1E>. Similarly, remaining nodes from view AE may be presented as a2E, a3E, a4E. After clustering the views, the clustered nodes may be stored in cuboid structure in memory system or file system.

When a query is received in ranges comprising a root dimension with a specific value for one or more non-root dimensions, the clustered views may be searched for the data. For example if the query is received for the cube values comprised in the dimensions A and E, as the views of the dimensions are clustered, a preliminary search may be performed on the clustered views. After performing the preliminary search, a set of valid values may be obtained from the clustered views by navigating within the cluster, without having to scan all the node dimension values.

In one implementation, in case the one or more dimensions are in hierarchical manner, the dimensions may be clustered and the views comprising upper levels i.e., top level of the hierarchy may be identified by the index number of the cluster. If the query is received for the primary levels comprising the root dimension and the parent dimension, the valid cells in the root dimension may be found and then the valid cells in the parent dimension may be found.

In one implementation, a method for updating the dwarf cuboid when there is a new data available is disclosed. After the dwarf cuboid is built, if there is a new data or incremental data available for the corresponding data, the incremental data may be updated in the dwarf cuboid that already exists. In order to update the incremental data on the dwarf cuboid that is built, the incremental data may be added to the dwarf cuboid without having to create a new dwarf cuboid. When the incremental data is updated, the data that existed may still be maintained in the dwarf cuboid. The incremental data may be incremented in the fact table of the data or in the dimension. For example, consider product, person, place are the dimensions, and the fact table for the purchasing person varies i.e. incremental data is added to the fact table. The incremental data in the fact table may be added to the dwarf cuboid comprising the cube values. In another example, a new member may be added for a dimension e.g. a new product is received in the incremental data.

When the incremental data is available, the incremental data may be processed similar to that of processing of the data, as described earlier. For the incremental data, a set of delta dwarf cuboids i.e. a dwarf cuboid built over the incremental data may be built. In order to illustrate the updating the incremental data on the dwarf cuboid that is exiting, Table 2 may be used as an example. Consider an example, a dwarf cuboid and one of the dimensions as PRODUCT [BrandName-ProductName]. Specifically, Table 2 shows the cube values for PRODUCT [BrandName-ProductName] dimension and assigned indexes for them.

Table 2: Updating Incremental Data

TABLE 2

| BrandName~ProductName | Indexes |
|---|---|
| LG~Cell01 | 1~1 |
| LG~Cell02 | 1~2 |
| LG~Cell03 | 1~3 |
| . . . | . . . |
| LG~TV01 | 1~40 |
| . . . | . . . |
| LG~WashingMachine01 | 1~48 |
| LG~WashingMachine02 | 1~49 |
| Sony~Mobile09 | 2~50 |
| Sony~TV8 | 2~51 |
| . . . | . . . |
| Sony~TV32 | 2~60 |
| Videocon~Cell | 3~61 |
| Videocon~TV62 | 3~90 |

As presented above, at the time of building the dwarf cuboid, the fact table may be partitioned on the PRODUCT dimension at the second mapreduce job. For the above example, consider that during building of the dwarf cuboid, the data is partitioned into two data blocks and the dwarf cuboids are built as shown in Table 3.

Table 3: Data Partition and Dwarf Cuboid

TABLE 3

| Dimension | Range (startIndex-endIndex) | Cuboid ID |
|---|---|---|
| Product | 1|1 to 1|49 (LG|Cell01 to LG|WashingMachine02) | Cuboid#1 |
| | 2|50 to 3|90 (Sony|Mobile09 to Videocon|TV62) | Cuboid#2 |
| | . . . | . . . |

After the data is partitioned and the dwarf cuboids are built, each dwarf cuboid may comprise a range defined for the data. Similarly, when the incremental data arrives, the incremental data is partitioned and the delta dwarf cuboids may be built. When the delta dwarf cuboids are built, the delta dwarf cuboids may also comprise a range defined for the incremental data. The ranges defined for the incremental data may not match with the ranges defined for the dwarf cuboid. In order to address such an issue, for the incremental data, an additional partition metadata may be maintained. Maintaining the additional partition metadata may lead to problems, because with each incremental data building, a new metadata corresponding to the partition may need to be maintained. In order to avoid maintaining the new metadata with each incremental data, the metadata used for building the dwarf cuboid may be considered for building the delta dwarf cuboids on the incremental data.

In order to better understand building of the delta dwarf cuboids on the incremental data, Table 4 may be used as an example. Consider there is one split/partition created for the incremental data. For the incremental data, 1|1 to 2|60, split #1, for which the dwarf cuboid may be built at map stage, i.e. delta #1. As presented above, in order to maintain the partition metadata of the incremental data, multiple delta dwarf cuboids may be built. Each delta dwarf cuboid may comprise the incremental data corresponding to the defined range in the partition metadata.

Table 4: Maintain Metadata of the Partition with the Incremental Metadata

TABLE 4

| |
|---|
| 1\|1 to 2\|60 split#1, |
|    delta#1 (containing data in range 1\|1 to 1\|49) |
|    delta#2 (containing data in range 2\|50 to 3\|90) |

Based on above, the delta dwarf cuboids may be added to the partition metadata of the dwarf cuboids. Table 5 illustrates the partition metadata of the incremental data added to the metadata of the dwarf cuboid.

Table 5: Partition Metadata of the Incremental Data Added to the Metadata of the Dwarf Cuboid

TABLE 5

| Dimension | Range (startIndex-endIndex) | Cuboid ID |
|---|---|---|
| Product | 1\|1 to 1\|49 (LG\|Cell01 to LG~WashingMachine02) | Cuboid#1, delta#1 |
| | 2\|50 to 3\|90 (Sony\|Mobile09 to Videocon\|TV62) | Cuboid#2, delta#2 |
| | ... | ... |

After adding the partition metadata of the incremental data to the metadata of the dwarf cuboid, the delta dwarf cuboid of the incremental data may be moved to the node where the corresponding dwarf cuboid resides. When the delta dwarf cuboid is built, the dwarf cuboid builder 102 may add the delta dwarf cuboid to the dwarf cuboid replicated at the plurality of query engines 132. The query engine 132 comprising the dwarf cuboid may receive the delta dwarf cuboid. The query engine 132 may merge the delta dwarf cuboid and the dwarf cuboid. The query engine 132 may merge the delta dwarf cuboid and the dwarf cuboid in a separate execution.

When the delta dwarf cuboids are built for the incremental data and are added to the dwarf cuboids, new indexes may be assigned for the new dimension members. Further, the new indexes may be merged with the dwarf cuboids. In order to understand adding the new members in the dimension while updating the incremental data, Table 2 presented above may be used as an example. For the example shown in Table 2, consider two new products LG~WashingMachine03 and LG~WashingMachine04 are found in the incremental data. For the incremental data, assigning the new indexes to the new members on the indexes of the dwarf cuboid may not be feasible. This is because assigning the new indexes in an incremental order of integers may fall in the range that the data is partitioned for the dwarf cuboid. Further, when the new indexes are assigned in the range, querying for the data in that range may be cumbersome. In order to address such an issue, the new indexes may be assigned to the new members based on their lexicographic order. In order to explain assigning the new indexes in the range of the dwarf cuboid, Table 2 may be used as an example. For the example shown in Table 2, the new indexes for the new members should be between '1~48' and '1~49'. For the new indexes, a floating index i.e. a real number may be assigned to the new members. To illustrate assigning new indexes, Table 6 may be used as an example. Specifically, Table 6 illustrates the assigning of the real number to the new products for the example presented in Table 2.

Table 6: Assigning Real Number to New Products

TABLE 6

| BrandName~ProductName | Indexes |
|---|---|
| LG~Cell01 | 1~1 |
| LG~Cell02 | 1~2 |
| LG~Cell03 | 1~3 |
| ... | ... |
| LG~TV01 | 1~40 |
| ... | ... |
| LG~WashingMachine01 | 1~48 |
| LG~WashingMachine02 | 1~49 |
| LG~WashingMachine03 | 1~49.1 |
| LG~WashingMachine04 | 1~49.2 |
| Sony~Mobile09 | 2~50 |
| Sony~TV8 | 2~51 |
| ... | ... |
| Sony~TV32 | 2~60 |
| Videocon~Cell | 3~61 |
| Videocon~TV62 | 3~90 |

In one implementation, sampling of the data is disclosed. For the data, if the cube values are not evenly distributed, a sampling may be performed on the dataset. In one example, consider the dataset may comprise ten thousand cube values. For the data, split boundaries may be defined for the cube values determined at the time of partitioning the data. The split boundaries may be defined to distribute the data evenly/uniformly. For defining the split boundaries, the data may have to be sorted. For example, a random sample rows may be determined for the data. For the range, a range of numbers may be determined and the split boundaries may be determined. For example, for the ten thousand cube values, the data may be partitioned into ten splits and each partition may comprise the cube values from 1-1000, 1001-2000 and so on. In case of the incremental data, new split boundaries may be created of the even size. For the new split boundaries, delta dwarf cuboids may be built. In order to update the data, the dwarf cuboid and the delta dwarf cuboid may be merged as presented above.

Figure 7:
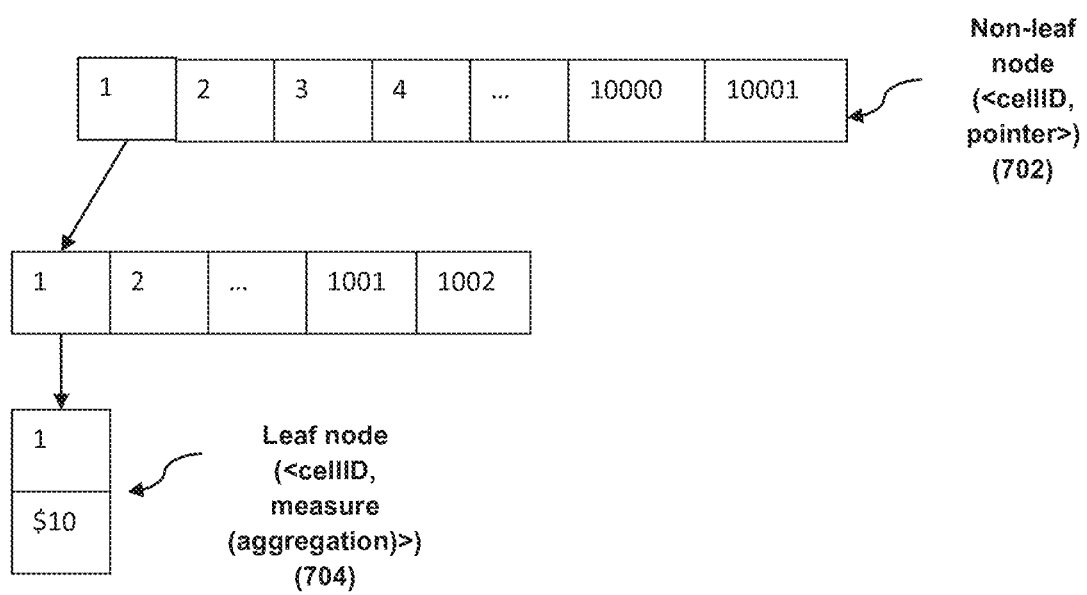
FIG. 7 illustrates a compression of a dwarf cuboid structure, in accordance with an embodiment of the present disclosure.

In one implementation, compressing a structure of the dwarf cuboid is disclosed. Consider the structure of the dwarf cuboid is as shown in FIG. 7, when a cellID or a pointer i.e. at a non-leaf node 702 and at a leaf node 704 has to be written on the local disk of the query engine 132, an address on the local disk may be determined. The local disk may store the cellID and the pointer in a form of an integer. As the cellID and the pointer are defined in the form of the integer, the integer on the local disk may take space of 4 bytes. Further, if the address of the local disk is huge, the pointer may take 8 bytes. The size of the integer may be compressed using a variable length encoding technique. The variable length encoding technique indicates converting the integers corresponding to the cellID and the pointer into binary format. As the size of the binary format is less, the size of the address on the local disk may be minimized.

Similarly, for the indexes having larger cube values, space on the local disk may be reduced. For reducing the space on the local disk for storing the indexes, the difference of the cube values sorted may be determined and the difference may be stored on the local disk. The difference of the cube values may be stored using a delta packing technique. The delta packing technique indicates calculating the difference of the cube values in the sorting order and storing the difference of the cube values. For example, consider the indexes comprise the cube values in the order 2, 5 and 6. After applying the delta packing technique, the difference between the cube values i.e. 2 and 5, 5 and 6 may be determined and corresponding difference may be stored on the local disk. For the above example, using the delta packing technique, the differences in the cube values i.e. 3 and 1 may be stored on the local disk. In another example, consider the indexes that may be sorted as

| 1 | 2 | 4 | 5 | ... | 1000 | 1002 |
|---|---|---|---|-----|------|------|

Upon applying the delta packing technique, the indexes may be stored as:

| 1 | 1 | 2 | 1 | ... | 1 | 2 |
|---|---|---|---|-----|---|---|

In one implementation, the delta packing technique may be applied on the cellID and the pointer.

In one implementation, an attribute and run-time aggregation of the dwarf cuboid is disclosed. While building the dwarf cuboid, the measures for the cube values against the attributes are not pre-computed. As the measures are not computed for attributes, an index may be created for the attribute. Creation of the index may facilitate in fast run time aggregation when a query comprising an attribute is received. For creating the index, at the time of building the dwarf cuboid, for each dimension comprising the attributes, a lowest level of its hierarchy may be determined. For example, referring to Table 7, the dimension, country comprises state and city in an order. For the dimension, the city may indicate the lowest level in the hierarchy. Further, for the dimension, a primary key may be identified. For the example shown in Table 7, the primary key Cid may be identified for the dimension, customer. If the dimension does not comprise the primary key, then a composite primary key may be determined. The composite primary key may comprise hierarchy of all the levels and the attributes. For the attributes, an attribute value may be created. The attribute value may be mapped to the primary key of the dimension. The attribute value may be mapped to the primary key of the dimension as shown in Table 7.

Table 7: Attribute Value Mapping

TABLE 7

| |
|---|
| (dimension) |
| Customer |
| (Hierarchy) |
| Country |
| State |

TABLE 7-continued

| |
|---|
| City |
| name |
| (Attribute) |
| Gender |
| Marital status |
| Cid (primary key) |

In order to illustrate the run-time aggregation, Table 8 may be used as an example. In order to aggregate the attributes at run-time, a pseudo level of the primary key may be introduced in the structure of the dwarf cuboid. Using the primary key, the dwarf cuboid may be created. The aggregation of the attributes at run-time may be illustrated using an example illustrated in Table 8.

Table 8: Aggregation of the Attributes at Run-Time

TABLE 8

| Item item name | brand name | size | colour | Customer person name | city | gender | marital status | Measures sales | Tuple |
|---|---|---|---|---|---|---|---|---|---|
| i1 | b1 | S | Red | p1 | c1 | Male | married | $10 | Tuple 1 |
| i2 | b1 | L | Green | p1 | c1 | Male | married | $15 | Tuple 2 |
| i1 | b1 | S | Red | p2 | c1 | Female | married | $10 | Tuple 3 |
| i1 | b1 | S | Red | p3 | c2 | Male | single | $10 | Tuple 4 |
| i2 | b1 | L | Green | p3 | c2 | Male | single | $15 | Tuple 5 |
| ... | | | ... | | | ... | ... | ... | ... |

The structure of the dwarf cuboid built using the primary key for the example presented in Table 8 may be presented as in Table 9.

Table 9: Dwarf Cuboid Structure Built Using the Primary Key

TABLE 9

| | | |
|---|---|---|
| Dim1: (Item): | brand name - item name | [attributes: size, color] |
| Dim2: (Customer): | city - person name | [attributes: gender, marital status] |
| Measures: | SUM(sales) | |

From the Table 8, the cube values of the attribute may be merged from the dimension that may be same as the dwarf cuboid. The cube values of the attribute that are merged may be inserted on the HDFS 128. For the attributes, the primary key may be generated. In one example, for the attribute size-color, the primary keys may be generated. The primary keys generated for the example illustrated above may be presented in Table 10.

Table 10: Primary Keys Generated for the Attributed Values

TABLE 10

| RowKey | c:id |
|---|---|
| Customer*c1~@~p1~@~(Male~!~married) | |
| Customer*c1~@~p2~@~(Female~!~married) | |
| Customer*c2~@~p3~@~(Male~!~single) | |
| Item*b1~@~i1~@~(S~!~Red) | |
| Item*b1~@~i2~@~(L~!~Green) | |

For the example shown in Table 10, the attributes may be merged and inserted in a new row on the HDFS 128. For example, for the dimension comprising the primary key, Customer*c1~@~p1~@~(Male~!~married) and the attributes '1~@~1~@~1' may be merged. The attributes and the primary key merged may be inserted on the HDFS 128. Similarly, other attributes such as gender and marital status may also be merged and inserted in another row on the HDFS 128. The attributes merged for the example shown in Table 10 may be presented in Table 11.

Table 11: Merged Attributes

TABLE 11

| RowKey | c:id | c:gender | c:marital status | c:color | c:size |
|---|---|---|---|---|---|
| Customer*c1~@~p1~@~(Male~!~married) | 1~@~1~@~1 | | | | |
| Customer*c1~@~p2~@~(Female~!~married) | 1~@~2~@~2 | | | | |
| Customer*c2~@~p3~@~(Male~!~single) | 2~@~3~@~3 | | | | |
| Item*b1~@~i1~@~(S~!~Red) | 1~@~1~@~1 | | | | |
| Item*b1~@~i2~@~(L~!~Green) | 1~@~2~@~2 | | | | |
| Customer_PK*01 | | Male | married | | |
| Customer_PK*02 | | Female | married | | |
| Customer_PK*03 | | Male | single | | |
| Item_PK*01 | | | | Red | S |
| Item_PK*02 | | | | Green | L |

When the dwarf cuboid builder 102 receives the query comprising the attributes to be retrieved, the query may be broadcasted to all of the query engines 132. Each of the query engines 132 may comprise a mapping per attribute of "dimension primary key to attribute value." The "dimension primary key to attribute value" mapping may replace the dimensions comprising the primary keys with the cube values of the attribute. When the dwarf cuboid builder 102 receives the query, the dwarf cuboid may be queried to fetch results from the dimension. The dimension may comprise the primary keys instead of the attributes that are required. As the dimensions comprising primary keys are replaced with the cube value of the attributes, the cube values may be retrieved from the dimension. The cube values from the dimension are retrieved by the query engine 132. After retrieving the cube values from the dimension, the cube values may be aggregated and returned to the dwarf cuboid builder 102. When the results are received by the dwarf cuboid builder 102, the result may not contain the dimension comprising the primary keys.

Figure 8:
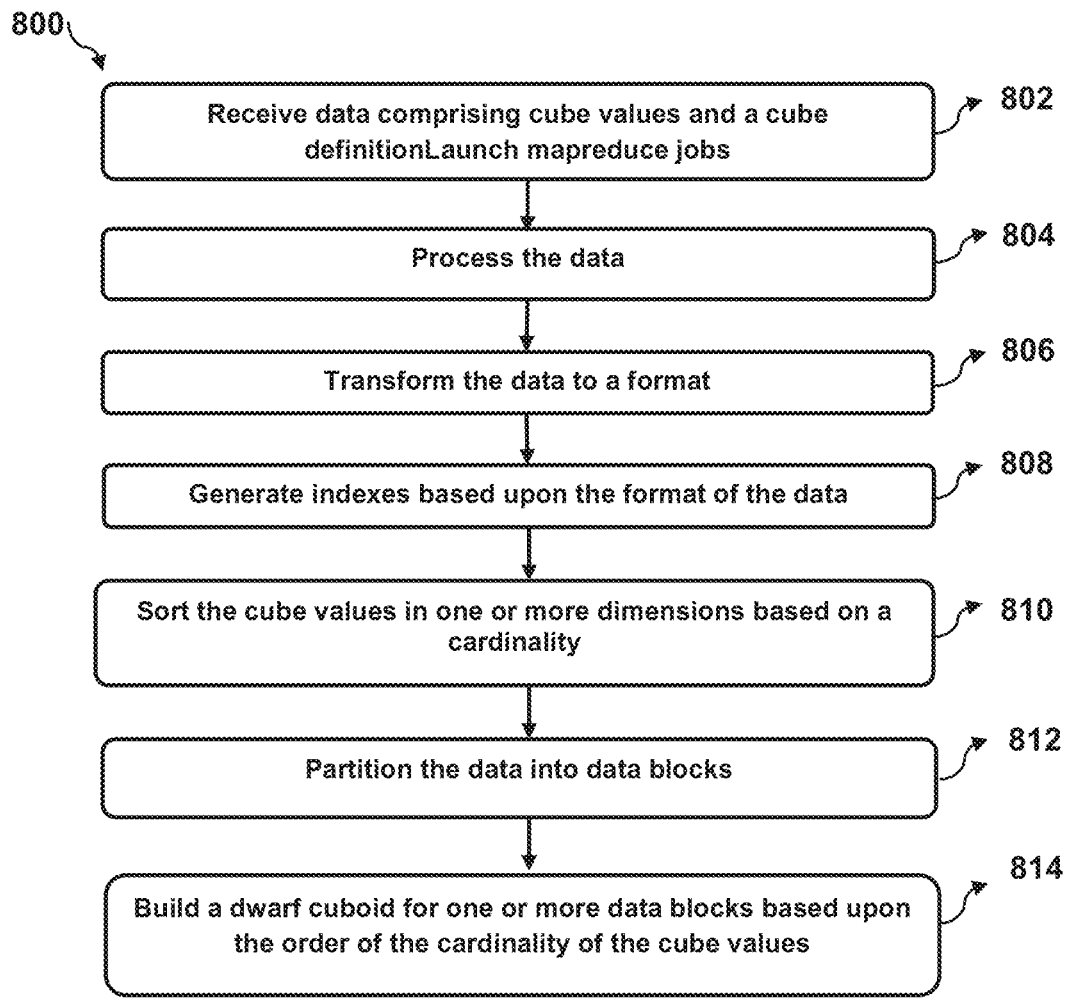
FIG. 8 illustrates a method for building a distributed dwarf cube using a mapreduce technique, in accordance with an embodiment of the present disclosure.

Referring now to FIG. 8, a method 800 for building a dwarf cuboid using a mapreduce technique is shown, in accordance with an embodiment of the present disclosure. The method 700 may be described in the general context of computer executable instructions. Generally, computer executable instructions can include routines, programs, objects, components, data structures, procedures, modules, functions, etc., that perform particular functions or implement particular abstract data types. The method 800 may also be practiced in a distributed computing environment where functions are performed by remote processing devices that are linked through a communications network. In a distributed computing environment, computer executable instructions may be located in both local and remote computer storage media, including memory storage devices.

The order in which the method 800 is described and is not intended to be construed as a limitation, and any number of the described method blocks can be combined in any order to implement the method 800 or alternate methods. Additionally, individual blocks may be deleted from the method 800 without departing from the spirit and scope of the disclosure described herein. Furthermore, the method may be implemented in any suitable hardware, software, firmware, or combination thereof. However, for ease of explanation, in the embodiments described below, the method 800 may be implemented in the above-described dwarf cuboid builder 102.

At step/block 802, data comprising cube values and a cube definition may be received. The cube definition comprises dimensions defined for the cube values.

At step/block 804, the data received is processed.

At step/block 806, the data may be transformed to a format.

At step/block 808, based upon the format of the data, indexes may be generated.

At step/block 810, the cube values in one or more dimensions may be sorted based on a cardinality of the cube values. The cube values may be sorted in an order of highest cardinality to lowest cardinality. The cardinality indicates distinctiveness of the cube values in the one or more dimensions.

At step/block 812, the data may be partitioned into data blocks.

At step/block 814, for one or more data blocks, a dwarf cuboid may be built based upon the order of the cardinality of the cube values.

Although implementations of system and method for building a dwarf cuboid using a mapreduce technique have been described in language specific to structural features and/or methods, it is to be understood that the appended claims are not necessarily limited to the specific features or methods described. Rather, the specific features and methods are disclosed as examples of implementations for building a dwarf cuboid.

The invention claimed is:

1. A method for building a distributed dwarf cube comprising a plurality of dwarf cuboids using a mapreduce technique, the method comprising:
    receiving, by a processor, data comprising cube values and a cube definition, wherein the cube definition comprises dimensions defined for the cube values, wherein the dimensions indicate a structural attribute of the dwarf cuboid; and
    processing, by the processor, the data by launching a series of mapreduce jobs by a driver according to the dimensions, wherein each mapreduce job comprises a mapper and a reducer, wherein the mapper divides the task into sub-tasks and distributes the task to a plurality of nodes in the dwarf cuboid builder, and wherein the reducer collects responses to the tasks and provides an output, wherein the processing comprises:
        transforming the data to a format;
        generating indexes based upon the format of the data at a first mapreduce job of the series of mapreduce jobs, wherein the indexes are generated for each dimension in the data by sorting cube values distinct for each dimension, creating a single sorted map by merging the cube values distinct for each dimension, and using the single sorted map for generating the indexes, wherein each cube value is replaced with the corresponding index for each dimension of the data;

sorting, based on the indexes associated with each cube value and a cardinality of the cube values, the cube values in one or more dimensions, wherein the cube values are sorted with in an order of highest cardinality to lowest cardinality at a second mapreduce job of the series of mapreduce jobs, and wherein the cardinality indicates distinctiveness of the cube values in the one or more dimensions;

partitioning, by the processor, the sorted data into data blocks based on a predefined size, wherein each data block is associated with a range, wherein the range corresponds to a start cube value and an end cube value of the highest cardinality dimension in the data block, wherein the range of the partition is used for performing a binary search for locating the dwarf cuboid based on the query; and building, by the processor, a distributed dwarf cube, comprising multiple smaller dwarf cuboids, at a third mapreduce job of the series of mapreduce jobs, wherein each dwarf cuboid is generated, from a data block, based on the range associated with the data block by:

processing the data block using a dwarf algorithm, wherein a number of the multiple smaller dwarf cuboids is equal to one of a number of splits or data blocks, wherein the series of mapreduce jobs allows the creation of multiple splits of the data based on size, wherein the multiple splits are processed in parallel by launching one mapper for each split or each data block, and wherein the splits or the data blocks are distributed evenly amongst the multiple smaller dwarf cuboids, eliminating the dimensions with the highest cardinality from the data and obtaining remaining dimensions, processing the data recursively based on the series of mapreduce jobs until all the remaining dimensions in the data block are eliminated, and storing the distributed dwarf cuboid on a Distributed File System, wherein the distributed dwarf cuboid is distributed on a plurality of query engines, and wherein the dwarf cuboids are replicated on the query engine in the case of a plurality of requests.

2. The method of claim 1, wherein the one or more dimensions are in a form of a single file fact table or star schema.

3. The method of claim 2, wherein the generation of the indexes, for the star schema, further comprises replacing the cube values comprising primary keys with the indexes in a sorted order.

4. The method of claim 2, wherein the generation the indexes, for the fact table comprises:
creating a tree map for the cube values, wherein the tree map comprises a disk based treemap and a tree like data structure;
collecting the cube values that are distinct in the tree map;
sorting the cube values that are distinct for the dimension; and
replacing the cube values with the indexes for the dimension.

5. The method of claim 1, further comprising replicating the dwarf cuboid on a query engine, the replication comprising:
requesting a thread to replicate the dwarf cuboid on the query engine, wherein the thread indicates at least one sequential flow of control within a program instruction; and
copying the dwarf cuboid on the query engine based on a replication factor, wherein the replication factor indicates number of the query engines available for the replication.

6. The method of claim 1, further comprising updating the dwarf cuboid, the updating comprising:
receiving an incremental data, wherein the incremental data indicates at least a record that is added in a dimension in a single file or a fact table; and
adding the incremental data in the single file or the fact table of the dimension.

7. The method of claim 1, further comprising aggregating an attribute at a run-time of building the dwarf cuboid, the aggregating comprises:
introducing a primary key at a pseudo level in the dimensions; and
creating a new dwarf cuboid using the primary key.

8. The method of claim 1, further comprising combining two or more dimensions in the dwarf cuboid, wherein the two or more dimensions comprises at least one root dimension comprising one or more non-root dimensions.

9. A system for building a distributed dwarf cube comprising a plurality of dwarf cuboids using a mapreduce technique, the system comprising:
a processor; and
a memory coupled to the processor, wherein the processor executes program instructions stored in the memory, to:
receive data comprising cube values and a cube definition, wherein the cube definition comprises dimensions defined for the cube values, and wherein the dimensions indicate a structural attribute of the dwarf cuboid; and
process the data by launching a series of mapreduce jobs by a driver according to the dimensions, wherein each mapreduce job comprises a mapper and a reducer, wherein the mapper divides the task into sub-tasks and distributes the task to a plurality of nodes in the dwarf cuboid builder, and wherein the reducer collects responses to the tasks and provides an output, wherein the processing comprises:
transforming the data to a format;
generating indexes based upon the format of the data at a first mapreduce job of a series of mapreduce jobs, wherein the indexes are generated for each dimension in the data by sorting cube values distinct for each dimension, creating a single sorted map by merging the cube values distinct for each dimension, and using the single sorted map for generating the indexes, wherein each cube value is replaced with the corresponding index for each dimension of the data;
sorting, based on the indexes associated with each cube value and a cardinality of the cube values, the cube values in one or more dimensions, wherein the cube values are sorted with in an order of highest cardinality to lowest cardinality at a second mapreduce job of the series of mapreduce jobs, and wherein the cardinality indicates distinctiveness of the cube values in the one or more dimensions;

partitioning the sorted data into data blocks based on a predefined size, wherein each data block is associated with a range, wherein the range corresponds to a start cube value and an end cube value of the highest cardinality dimension in the data block; wherein the range of the partition is used for performing a binary search for locating the dwarf cuboid based on the query; and building a distributed dwarf cube, comprising multiple smaller dwarf cuboids, at a third mapreduce job of the series of mapreduce jobs, wherein each dwarf cuboid is generated, from a data block, wherein a number of the multiple smaller dwarf cuboids is equal to one of a number of splits or data blocks, wherein the series of mapreduce jobs allows the creation of multiple splits of the data based on size, wherein the multiple splits are processed in parallel by launching one mapper for each split or each data block, and wherein the splits or the data blocks are distributed evenly amongst the multiple smaller dwarf cuboids based on the range associated with the data block by:

processing the data block using a dwarf algorithm, eliminating the dimensions with the highest cardinality from the data and obtaining remaining dimensions, processing the data recursively based on the series of mapreduce jobs until all the remaining dimensions in the data block are eliminated, and storing the distributed dwarf cuboid on a Distributed File System; wherein the distributed dwarf cuboid is distributed on a plurality of query engines, and wherein the dwarf cuboids are replicated on the query engines in the case of a plurality of requests.

10. The system of claim 9, wherein the one or more dimensions are in a form of a single file (star schema) or a fact table.

11. The system of claim 10, wherein the generation of the indexes for the star schema further comprises the processor to execute program instructions to generate replace the cube values comprising primary keys with the indexes in a sorted order.

12. The system of claim 10, wherein the generation of the indexes for the star schema comprises the processor to execute the program instructions to:

create a tree map for the cube values, wherein the tree map comprises a disk based treemap and a tree like data structure;

collect the cube values that are distinct in the tree map;

sort the cube values that are distinct for the dimension; and replace the cube values with the indexes for the dimension.

13. The system of claim 10, wherein the processor further executes the program instructions to replicate the dwarf cuboid on a query engine, the replication comprising:

requesting a thread to replicate the dwarf cuboid on the query engine, wherein the thread indicates at least one sequential flow of control within a program instruction; and copying the dwarf cuboid on the query engine based on a replication factor, wherein the replication factor indicates number of the query engines available for the replication.

14. The system of claim 9, wherein the processor further executes the program instructions to update the dwarf cuboid, the updating comprising:

receiving an incremental cube values, wherein the incremental cube values indicates at least a record that is added in a dimension in a single file or a fact table; and adding the incremental cube values in the single file or the fact table of the dimension.

15. The system of claim 9, wherein the processor further executes the program instructions to aggregate an attribute at a run-time of building the dwarf cuboid, the aggregating comprises:

introducing a primary key at a pseudo level in the dimensions; and creating a new dwarf cuboid using the primary key.

16. The system of claim 9, wherein the processor further executes the program instructions to combine two or more dimensions in the dwarf cuboid, wherein the two or more dimensions comprises at least one root dimension comprising one or more non-root dimensions.

17. A non-transitory computer readable medium embodying a program executable in a computing device for building a distributed dwarf cube comprising a plurality of dwarf cuboids using a mapreduce technique, the program comprising:

a program code for receiving data comprising cube values and a cube definition, wherein the cube definition comprises dimensions defined for the cube values; wherein the dimensions indicate a structural attribute of the dwarf cuboid; and a program code for processing the data by launching a series of mapreduce jobs by a driver according to the dimensions, wherein each mapreduce job comprises a mapper and a reducer, wherein the mapper divides the task into sub-tasks and distributes the task to a plurality of nodes in the dwarf cuboid builder, and wherein the reducer collects responses to the tasks and provides an output, wherein the processing comprises:

a program code for transforming the data to a format;

a program code for generating indexes based upon the format of the data at a first mapreduce job of a series of mapreduce jobs, wherein the indexes are generated for each dimension in the data by sorting cube values distinct for each dimension, creating a single sorted map by merging the cube values distinct for each dimension, and using the single sorted map for generating the indexes, wherein each cube value is replaced with the corresponding index for each dimension of the data;

a program code for sorting, based on the indexes associated with each cube value and a cardinality of the cube values, the cube values in one or more dimensions, wherein the cube values are sorted with in an order of highest cardinality to lowest cardinality at a second mapreduce job of the series of mapreduce jobs, and wherein the cardinality indicates distinctiveness of the cube values in the one or more dimensions;

a program code for partitioning the sorted data into data blocks based on a predefined size, wherein each data block is associated with a range, wherein the range corresponds to a start cube value and an end cube value of the highest cardinality dimension in the data block; wherein the range of the partition is used for performing a binary search for locating the dwarf cuboid based on the query; and a program code for building a distributed dwarf cube, comprising multiple smaller dwarf cuboids, at a third mapreduce job of the series of mapreduce jobs, wherein each dwarf cuboid is generated, from a data block, wherein a number of the multiple smaller dwarf cuboids is equal to one of a number of splits or data blocks, wherein the series of mapreduce jobs allows the creation of multiple splits of the data based on size, wherein the multiple splits are processed in parallel by launching one mapper for each split or each data block, and wherein the splits or the data blocks are distributed evenly amongst the multiple smaller dwarf cuboids based on the range associated with the data block by:

processing the data block using a dwarf algorithm, eliminating the dimensions with the highest cardinality from the data and obtaining remaining dimensions, and processing the data recursively based on the series of mapreduce jobs until all the remaining dimensions in the data block are eliminated, and storing the distributed dwarf cuboid on a Distributed File System; wherein the distributed dwarf cuboid is distributed on plurality of query engines, wherein the dwarf cuboids are replicated on the query engines in the case of a plurality of requests.

18. The method of claim 1, wherein partitioning, by the processor, the data into data blocks, further comprises:

receiving, by the processor, incremental data;

identifying, by the processor, ranges from the one or more dimensions, for processing the incremental data, wherein a range comprises a start value and an end value;

partitioning, by the processor, the incremental data, into one or more data blocks based on predetermined size of the data blocks; and building, by the processor, one or more delta dwarf cuboids based on the one or more data blocks and the ranges extracted from the one or more dimensions.

* * * * *